(12) United States Patent
Cho et al.

(10) Patent No.: US 12,354,290 B2
(45) Date of Patent: Jul. 8, 2025

(54) SAMPLE DEPTH-MEASURING DEVICE AND METHOD

(71) Applicant: Industrial Technology Research Institute, Hsinchu (TW)

(72) Inventors: Chia-Hung Cho, Hsinchu (TW); Yi-Sha Ku, Hsinchu (TW); Cheng-Kang Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 223 days.

(21) Appl. No.: 18/308,223

(22) Filed: Apr. 27, 2023

(65) Prior Publication Data

US 2024/0331178 A1    Oct. 3, 2024

(30) Foreign Application Priority Data

Mar. 29, 2023   (TW) .................................. 112111915

(51) Int. Cl.
*G01B 11/22*   (2006.01)
*G06T 7/521*   (2017.01)

(52) U.S. Cl.
CPC .............. *G06T 7/521* (2017.01); *G01B 11/22* (2013.01); *G06T 2207/10028* (2013.01)

(58) Field of Classification Search
CPC .......... G06T 7/521; G06T 2207/10028; G01B 11/22
See application file for complete search history.

(56) References Cited

U.S. PATENT DOCUMENTS

| 7,019,844 B2 | 3/2006 | Venugopal et al. |
| 8,699,021 B2 | 4/2014 | Ku et al. |
| 10,725,279 B2 | 7/2020 | Hua et al. |
| 2003/0165755 A1 | 9/2003 | Mui et al. |

(Continued)

FOREIGN PATENT DOCUMENTS

| CN | 1421045 A | 5/2003 |
| CN | 112097645 A | 12/2020 |
| TW | I414818 | 11/2013 |

(Continued)

OTHER PUBLICATIONS

Taiwan Patent Office, Office Action, Patent Application Serial No. 112111915, Mar. 13, 2024, Taiwan.

(Continued)

*Primary Examiner* — Tony Ko

(57) ABSTRACT

A measuring device includes a light source unit, a light modulation unit, a spectrum sensing unit, an image sensing unit, and a processing unit. The light source unit projects a first light path to a sample and receives a second light path reflected from the sample. The light module unit tilts the second light path to become a third light path or a fourth light path. The spectrum sensing unit receives the third light path to capture a spectrum corresponding to the microstructures. The image sensing unit receives the fourth light path to measure a captured image that corresponds to the sample. When the processing unit identifies the position of at least one of the microstructures in the captured image, the processing unit measures the depth of at least one of the microstructures from the spectrum for the identified area.

10 Claims, 12 Drawing Sheets

(56) References Cited

U.S. PATENT DOCUMENTS

2008/0297765 A1* 12/2008 Weidner .................. G01N 21/41
356/51
2022/0113129 A1* 4/2022 Golani ................... G01B 11/22

FOREIGN PATENT DOCUMENTS

TW            I603076       10/2017
WO    WO2003075342 A2    9/2003

OTHER PUBLICATIONS

Yi-Sha Ku et al. "Characterization of high density through silicon vias with spectral reflectometry", Optics Express 5993, Mar. 2011, 14 pages, vol. 19, No. 7, OSA, US.

* cited by examiner

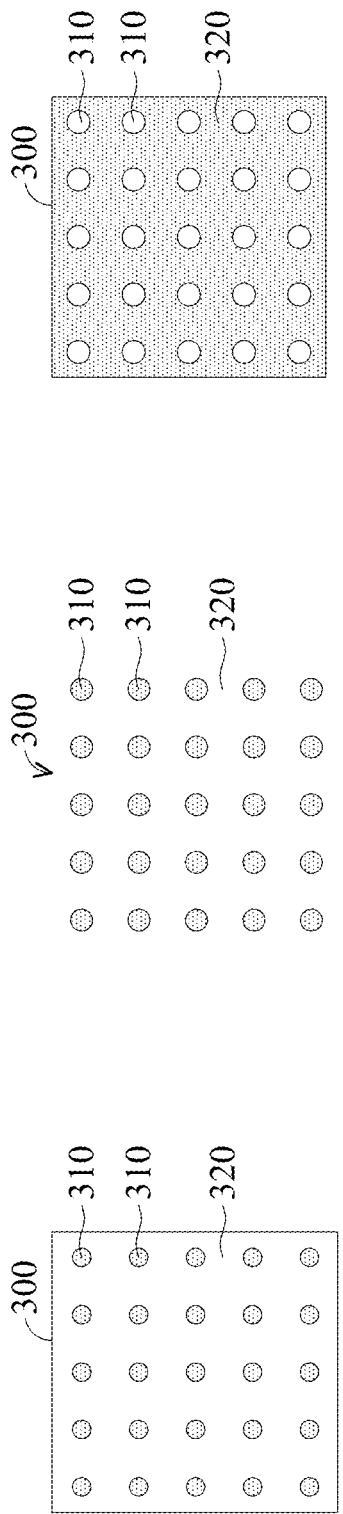
FIG. 3A
FIG. 3B
FIG. 3C
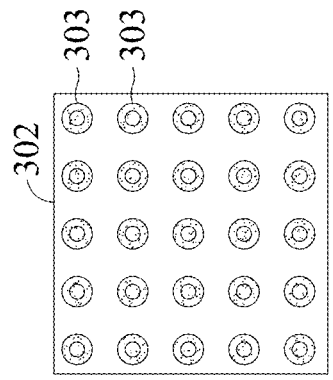
FIG. 3E
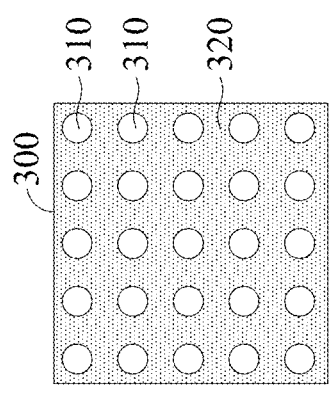
FIG. 3D

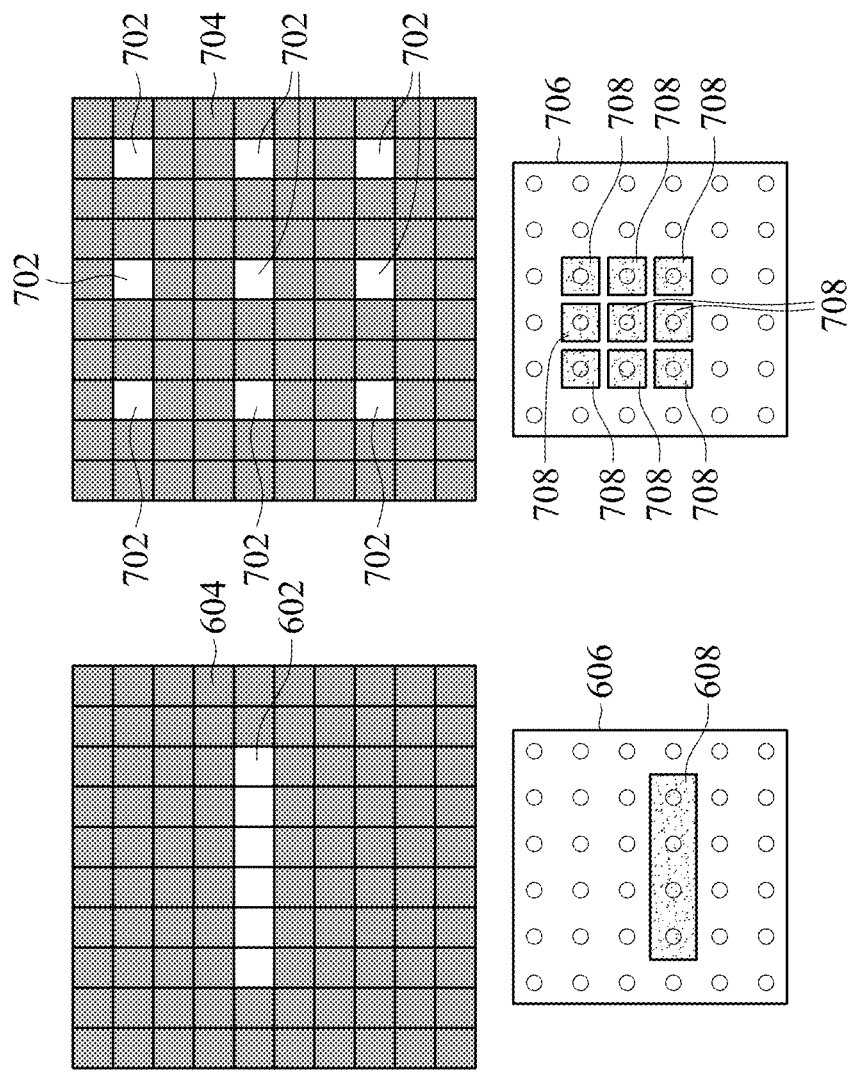
FIG. 7
FIG. 6
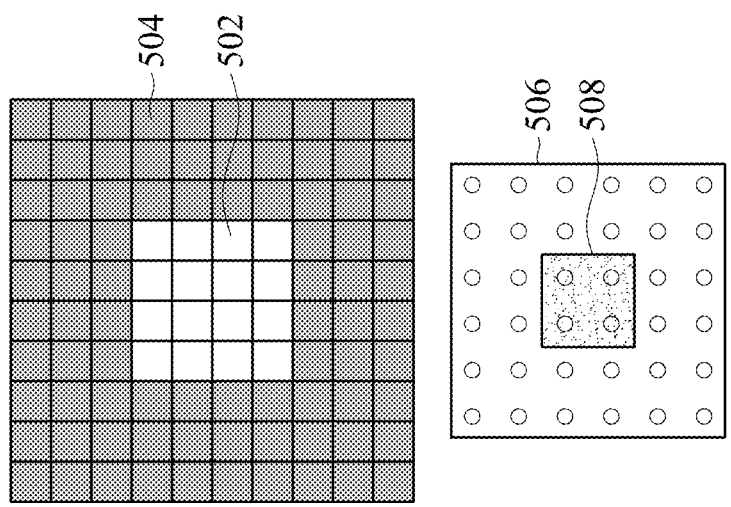
FIG. 5

SAMPLE DEPTH-MEASURING DEVICE AND METHOD

CROSS REFERENCE TO RELATED APPLICATIONS

This application claims priority of Taiwan Patent Application No. 112111915, filed on Mar. 29, 2023, the entirety of which is incorporated by reference herein.

BACKGROUND OF THE DISCLOSURE

Field of the Disclosure

The present disclosure relates to a sample depth-measuring device and method, and in particular, it relates to a sample depth-measuring device and method for measuring the depth of a microstructure.

Description of the Related Art

In the semiconductor manufacturing process used at present, a sample that is measured by existing reflectometers with a hole mirror is usually a micrometer structure (referred to a microstructure) with as a depth, such as a through-silicon via (TSV), a trench, or a redistribution layer (RDL), etc.

As the aperture of a through-silicon via gradually narrows and its depth-to-width ratio rises, the existing reflectometers relies on the hole mirror to measure the depth of the through-silicon via. Achieving detection without causing damage becomes increasingly challenging. For example, when the aperture of the through-silicon via falls within the range between 0.1 and 10 micrometers, including both 0.1 and 10 micrometers (referred to as small-aperture structures), and has a depth-to-width ratio is less than 60:1, using the existing spectrometers for depth measurement may results in inconsistencies with the actual depth of the through-silicon via. This inaccuracy can arise from measuring the surface between the through-silicon via and another adjacent through-silicon via, rather than the actual depth of the perforation in question. Especially, when the distance between the through-silicon via and another adjacent through-silicon via is greater than the aperture of the through-silicon via (referred to a low-density structure), the spectrometer may not accurately measure the depth of the through-silicon via due to detecting more of the surface.

Furthermore, when the existing spectrometers is configured to measure the single-aperture micrometer structure (referred to as a single aperture microstructure), most spectrometers measure the light signal reflected from the surface around the aperture and obtain the measurement result that is not consistent with the actual depth of the through-silicon via.

Therefore, according to the current measurement technology, the existing spectrometers may not achieve accurate and consistent results when measuring the small-aperture structures, the low-density structure, or the single-hole micrometer structure based on the light signal reflected by the micrometer structure. Given one of the aforementioned technical issues, a better solution to this technical issue is needed.

BRIEF SUMMARY OF THE DISCLOSURE

The main technical means adopted to achieve the above objectives, a sample depth-measuring device includes a light source unit, a light modulation unit, a spectrum sensing unit, an image sensing unit and a processing unit. The light source unit is configured to project a first light path to a sample and receive a second light path reflected from the sample. The sample includes a plurality of microstructures arrayed alongside a surface that lies beyond the microstructures. Each of the microstructures has a bottom situated below the surface. The light modulation unit includes an array of light intensity reflective elements arranged in a plurality, which are configured to reflect light onto the second light path within the array. Through the arrangement, one or more light intensity reflective elements can tilt the second light path by altering the light intensity, resulting in a change to either a third light path or a fourth light path. The spectrum sensing unit is configured to receive the third light path to capture a spectrum corresponding to the bottoms. The image sensing unit is configured to receive the fourth light path to measure a captured image corresponding to the sample. The processing unit is coupled to the light modulation unit, the spectrum sensing unit and the image sensing unit. When the processing unit identifies the position of at least one of the bottoms in the captured image, the processing unit measures the depth of at least one of the bottoms to the surface from the spectrum for the identified area.

The present disclosure provides a sample depth-measuring method, which includes the following steps. A light source unit is configured to project a first light path to a sample, which includes a plurality of microstructures arrayed alongside a surface that lies beyond the microstructures. Each of the microstructures has a bottom situated below the surface. The light source unit receives a second light path reflected from the bottoms and the surface. A light modulation unit including an array of light intensity reflective elements arranged in a plurality is used to reflect light onto the second light path within the array. One or more light intensity reflective elements tilt the second light path, resulting in a change to either a third light path or a fourth light path. A spectrum sensing unit is configured to receive the third light path to capture a spectrum corresponding to the bottoms. An image sensing unit is configured to receive the fourth light path to measure a captured image corresponding to the sample. A processing unit coupled to the light modulation unit, the spectrum sensing unit and the image sensing unit is configured to identify the position of at least one of the bottoms in the captured image, measure the depth of at least one of the bottoms to the surface from the spectrum for the identified area.

BRIEF DESCRIPTION OF THE DRAWINGS

The present disclosure can be more fully understood by reading the following detailed description and examples with reference to the accompanying drawings, wherein:

FIGS. 3A-3E are schematic views of a process of processing a modulated image according to an embodiment of the present disclosure;

FIG. 5 is a schematic view of a corresponding relationship between a change of a light modulation unit and the captured image according to an embodiment of the present disclosure;

FIG. 6 is a schematic view of a corresponding relationship between a change of a light modulation unit and the captured image according to an embodiment of the present disclosure;

FIG. 7 is a schematic view of a corresponding relationship between a change of a light modulation unit and the captured image according to an embodiment of the present disclosure;

DETAILED DESCRIPTION OF THE DISCLOSURE

Figure 1:
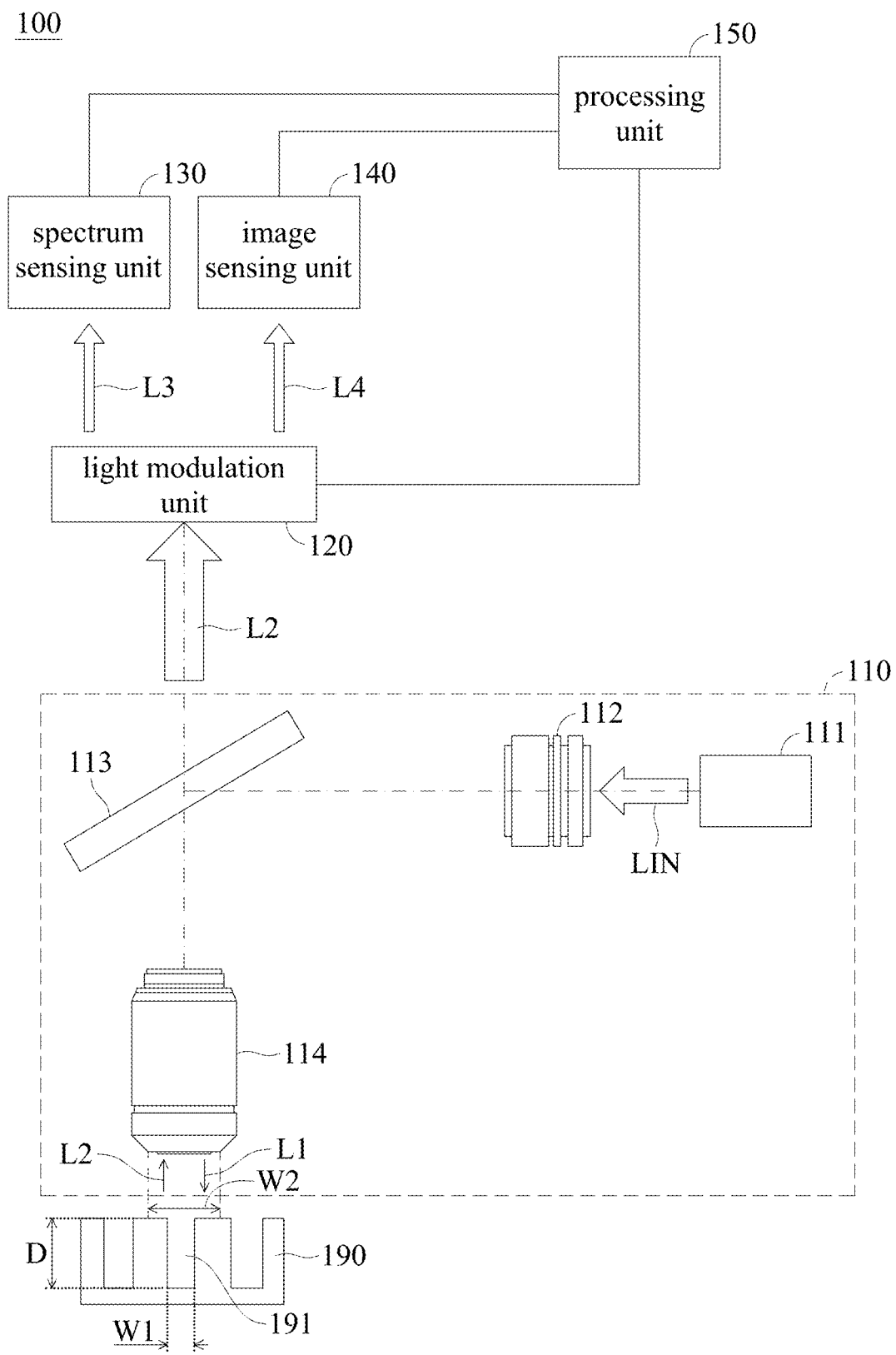
FIG. 1 is a schematic configuration view of a sample depth-measuring device according to an embodiment of the present disclosure.

For one embodiment of the present disclosure, please refer to FIG. 1. The present embodiment includes a sample depth-measuring device 100, which may measure a microstructure 191 included in the sample 190. For example, the ratio of the depth to the aperture width of a through-silicon via (TSV) can be less than or equal to 60:1 (D/W1≤60:1), where the aperture width W1 of the through-silicon via (TSV) is 3 micrometers (μm). However, the present disclosure is not limited to these parameters. Additionally, the sample 190 includes a plurality of microstructures 191 arrayed alongside a surface that lies beyond the microstructures 191. Each of the microstructures 191 has a bottom situated below the surface.

Please refer to FIG. 1. The sample depth-measuring device 100 includes a light source unit 110, a light modulation unit 120, a spectrum sensing unit 130, an image sensing unit 140 and a processing unit 150 that is coupled to the light modulation unit 120, the spectrum sensing unit 130 and the image sensing unit 140.

The light source unit 110 may project a first light path L1 to a sample 190, so that the sample 190 reflects the first light path L1 as a second light path L2, and the light source unit 110 receives the second light path L2 reflected from the sample 190. Furthermore, the light source unit 110 may include a light source 111, a first light focusing unit 112, a light splitting unit 113 and a second light focusing unit 114.

The light source 111 may project an input light path LIN. In the embodiment, the light source 111 may be a light-emitting diode, a lamp or another suitable light device. In addition, the light source 111 may be a white light, an infrared light or an ultraviolet light, but the present disclosure is not limited thereto. Furthermore, the light source 111 may also be a broadband light source, and the wavelength band of the broadband light source may be 380 nanometers (nm)-780 nanometers (nm), but the present disclosure is not limited thereto.

The light splitting unit 113 may receive the input light path LIN through the first light focusing unit 112, and reflect the input light path LIN as the first light path L1. The second light focusing unit 114 projects the first light path L1 to the sample 190. In addition, the first light focusing unit 112 and the second light focusing unit 114 may be light focusing lenses, and the light splitting unit 113 may be a beam splitter, but the present disclosure is not limited thereto.

The light modulation unit 120 may include a plurality of light intensity reflective elements arranged in an array. In the embodiment shown in FIG. 2, the light intensity reflective elements are an array of microlenses 210, 220 that is arranged in a digital micro-mirror device (DMD) 200, or an array of liquid-crystal molecules that is arranged in a liquid crystal on silicon (LCOS). However, the present disclosure is not limited to the embodiment. The light modulation unit 120 may receive the second light path L2 reflected from the sample 190 through the light source unit 110, and tilt the second light path L2 to change either a third light path L3 or a fourth light path L4 through selectively adjusting the light intensity of one or more light intensity reflective elements. For example, the digital micro-mirror device (DMD) 200 may adjust the tilted angle of the microlenses 210, 220 to change the shape of measurement area configured to detect one or more through-silicon vias, and the shape of the measurement area is the same as the first part 502, 602, or 702 in a modulated image 200 of the sample.

The spectrum sensing unit 130 may receive the third light path L3 to capture a spectrum corresponding to the bottoms of the sample 190. In the embodiment, the spectrum sensing unit 130 may be a spectrometer, but the present disclosure is not limited thereto. The image sensing unit 140 may receive the fourth light path L4 to measure a captured image corresponding to the sample 190. In the embodiment, the image sensing unit 140 may be a surface-type image sensing element, such as a charge-coupled device (CCD), but the present disclosure is not limited thereto.

The processing unit 150 receives both the bottom spectrum captured by the spectrum sensing unit 130 and the captured image measured by the image sensing unit 140. When the processing unit 150 identifies the position of at least one of the bottoms in the captured image, the processing unit 150 measures the depth of at least one of the bottoms to the surface from the spectrum for the identified area. In addition, the processing unit 150 further calculates the signal-to-noise ratio (SNR) corresponding to the microstructure 191 of the sample 190 according to the above spectrum and the above captured image. The signal-to-noise ratio may be expressed as (1-Noise-Signal)×100%=95 or more, "Noise" is the noise-signal intensity at the top and bottom of the microstructure 191 of the sample 190, and "Signal" is the interference-signal intensity at the top and bottom of the microstructure 191 of the sample 190. In the embodiment, the above signal-to-noise ratio is more than 95%. Therefore, the sample depth-measuring device 100 may indeed measure a measurement result that is consistent with the actual depth of the small-apertures, low-density structure, or a single-via microstructure. Not only that, but the present disclosure may still measure microstructures with large apertures, high-density or multiple vias, and be applied in various manufacturing process. In the embodiment, the processing unit 150 may be a microprocessor, a micro control unit (MCU) or another suitable processor, but the present disclosure is not limited thereto. Additionally, the reflection of the surface layer signal may be greatly reduced, and the bottom layer signal is increased to increase the strength of the interference signal.

In the embodiment, the light modulation unit 120 may receive the modulated image 300 corresponding to the sample 190, as shown in FIG. 3A. Then, the light modulation unit 120 obtains a microstructure position 310 and a non-microstructure position 320 corresponding to the sample 190 according to the modulated image 300. That is, the light modulation unit 120 may perform an image processing on the modulated image 300 of FIG. 3A. For example, the light modulation unit 120 may perform a binarization processing on the modulated image 300 of FIG. 3A to generate the modulated image 300 of FIG. 3B. For example, the microstructure position 310 presents a black color, and the non-microstructure position 320 presents a white color. Afterward, the light modulation unit 120 may perform a color processing on the modulated image 300 of FIG. 3B, for example, performing a black and white invert processing on the image to generate the modulated image 300 of FIG. 3C. For example, the microstructure position 310 presents the white color and the non-microstructure position 320 the black color. Then, the light modulation unit 120 may perform a dilated processing on the modulated image 300 of FIG. 3C, for example, dilating the range of the microstructure position 310 in the image to generate the modulated image 300 of FIG. 3D.

The light modulation unit 120 is coupled to and can adjust either the first or the second part of the light intensity reflective elements, which reflects light on the second light path L2, after receiving the driving signal. This tilts the second light path L2, resulting in a change of the third light path L3 or the four light path L4. The first part corresponds to the microstructure position 310, and the second part corresponds to the non-microstructure position 320. When the light modulation unit 120 tilts the first part to reflect light at a first angle based on the microstructure position 310 that corresponds to the sample 190, the light reflected on the second light path L2 changes to the third light path L3, which leads to the spectrum sensing unit 130. Alternatively, when the light modulation unit 120 tilts the second part to reflect light at a second angle based on the non-microstructure position 320 that corresponds to the sample 190, the light reflected on the second light path L2 changes to the fourth light path L4, which leads to the image sensing unit 140.

Embodiments of the different pattern shapes of the above first part and the above second part of the light intensity reflecting elements may be seen in FIGS. 5, 6 and 7, and will be described in detail later.

Furthermore, the above first part of the light intensity reflecting elements may tilt the second light path L2 at the first angle, so that the second light path L2 changes the third light path L3, and the above second part of the light intensity reflecting elements may tilt the second light path L2 at the second angle, so that the second light path L2 changes the fourth light path L4.

In addition, the above first angle may be different from the above second angle. The spectrum sensing unit 130 may be disposed corresponding to the first angle to receive the third light path L3. The image sensing unit 140 may be disposed corresponding to the second angle to receive the fourth light path L4.

In the embodiment, the modulated image 300 of FIG. 3A may be provided by the processing unit 150, for example. For example, firstly, the light source unit 110 projects the first light path L1 to the sample 190, so that the sample 190 reflects the first light path L1 to change the second light path L2. Then, the light modulation unit 120 adjusts all the light intensity reflective elements to the second angle, and tilts the second light path L2 through all the light intensity reflective elements to change the fourth light path L4, so that the image sensing unit 140 may obtain the modulated image 300 corresponding to the sample 190. Then, the processing unit 150 may receive the modulated image 300 corresponding to the sample 190 obtained by the image sensing unit 140, and provide the modulated image 300 to the light modulation unit 120 to perform the above measurement operation.

In the above embodiment, the light modulation unit 120 tilts the second light path L2 at the first angle and the second angle according to the modulated image 300 corresponding to FIG. 3D, so that the second light path L2 changes the third light path L3 and the fourth light path L4. Accordingly, the spectrum sensing unit 130 may capture the spectrum and the image sensing unit 140 may measure the captured image 302 shown in FIG. 3E to measure the surface structure of the sample 190, but the present disclosure is not limited thereto. It can be seen in FIG. 3E that the circled position 303 is the position where the spectrum sensing unit 130 obtains the spectrum.

Figure 4A:
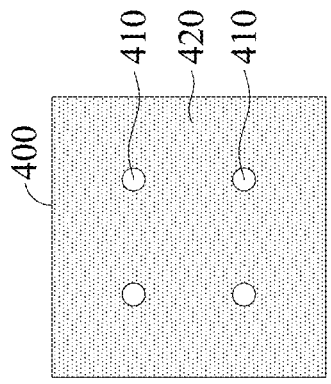
FIGS. 4A-4E are schematic views of a process of processing a modulated image according to an embodiment of the present disclosure.
Figure 4B:
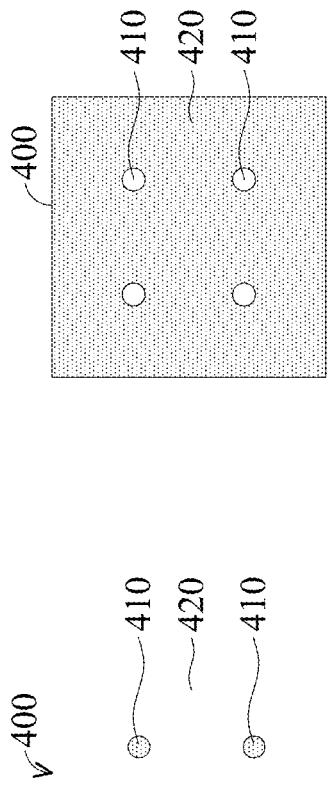
Figure 4C:
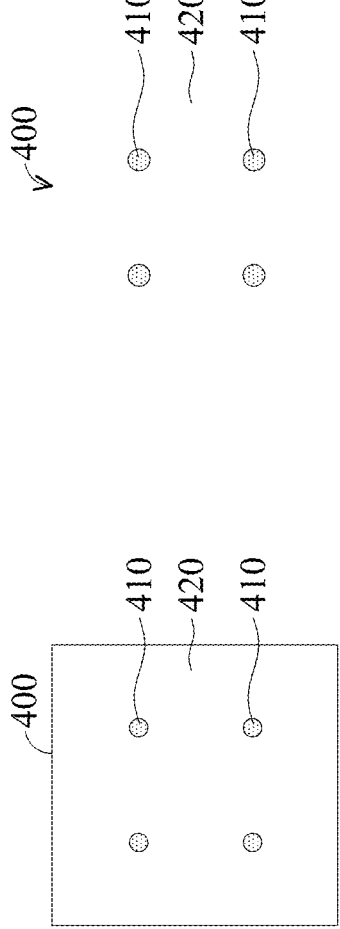
Figure 4D:
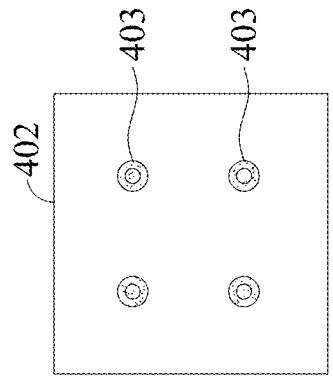
Figure 4E:
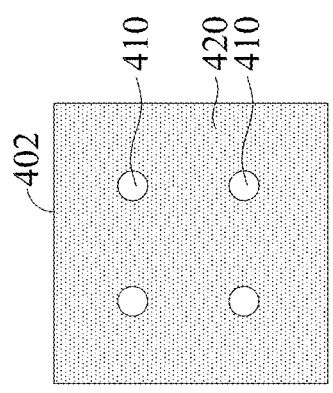

In some embodiments, the light modulation unit 120 may tilt the second light path L2 at the first angle and the second angle according to the modulated image 400 corresponding to FIG. 4D, so that the second light path L2 changes the third light path L3 and the fourth light path L4. Accordingly, the spectrum sensing unit 130 may capture the spectrum and the image sensing unit 140 may measure the captured image 402 shown in FIG. 4E to measure the surface structure of the sample 190, and the similar measurement result may also be achieved. It can be seen in FIG. 4E that the circled position 403 is the position where the spectrum sensing unit 130 obtains the spectrum. In addition, the modulated image 400 of FIG. 4D may be generated through the modulated image 400 of FIGS. 4A-4C. The processing process of FIGS. 4A-4D is the same as or similar to the processing process of FIGS. 3A-3D. Accordingly, the processing process of FIGS. 4A-4D may refer to the description of the processing process of FIGS. 3A-3D, and the description thereof is not limited thereto.

FIG. 5 is a schematic view of a corresponding relationship between a change of a light modulation unit and the captured image according to an embodiment of the present disclosure. In FIG. 5, the light modulation unit 120 adjusts the first part 502 of the light intensity reflective elements to the first angle, so that the first part 502 of the light intensity reflective elements tilts the second light path L2 to change the third light path L3. At the same time, the light modulation unit 120 adjusts the second part 504 of the light intensity reflective elements to the second angle, so that the second part 504 of the light intensity reflective elements tilts the second light path L2 to change the fourth light path L4. Accordingly, the spectrum sensing unit 130 may capture the spectrum and the image sensing unit 140 may measure the corresponding captured image 506. In addition, the outline of the first part 502 may be a box, and the captured image 506 may correspondingly presents the measurement area 508 of the box, wherein the measurement area 508 of the box is the position wherein the spectrum sensing unit 130 captures the spectrum.

FIG. 6 is a schematic view of a corresponding relationship between a change of a light modulation unit and the captured image based on an embodiment of the present disclosure. In FIG. 6, the light modulation unit 120 adjusts the first part 602 of the light intensity reflective elements to the first angle, so that the first part 602 of the light intensity reflective elements tilts the second light path L2 to change the third light path L3. At the same time, the light modulation unit 120 adjusts the second part 604 of the light intensity reflective elements to the second angle, so that the second part 604 of the light intensity reflective elements tilts the second light path L2 to change the fourth light path LA. Accordingly, the spectrum sensing unit 130 may capture the spectrum and the image sensing unit 140 may measure the corresponding captured image 606. In addition, the outline of the first part 602 may be a long line, and the captured image 606 may correspondingly presents the measurement area 608 of the long line, wherein the measurement area 608 of the long line is the position wherein the spectrum sensing unit 130 captures the spectrum.

FIG. 7 is a schematic view of a corresponding relationship between a change of a light modulation unit and the captured image based on an embodiment of the present disclosure. In FIG. 7, the light modulation unit 120 adjusts the first part 702 of the light intensity reflective elements to the first angle, so that the first part 702 of the light intensity reflective elements tilts the second light path L2 to change the third light path L3. At the same time, the light modulation unit 120 adjusts the second part 704 of the light intensity reflective elements to the second angle, so that the second part 704 of the light intensity reflective elements tilts the second light path L2 to change the fourth light path L4. Accordingly, the spectrum sensing unit 130 may capture the spectrum and the image sensing unit 140 may measure the corresponding captured image 706. In addition, the outline of the first part 702 may be a multi-point, and the captured image 706 may correspondingly presents the measurement area 708 of the multi-point, wherein the measurement area 708 of the multi-point is the position wherein the spectrum sensing unit 130 captures the spectrum.

Figure 8:
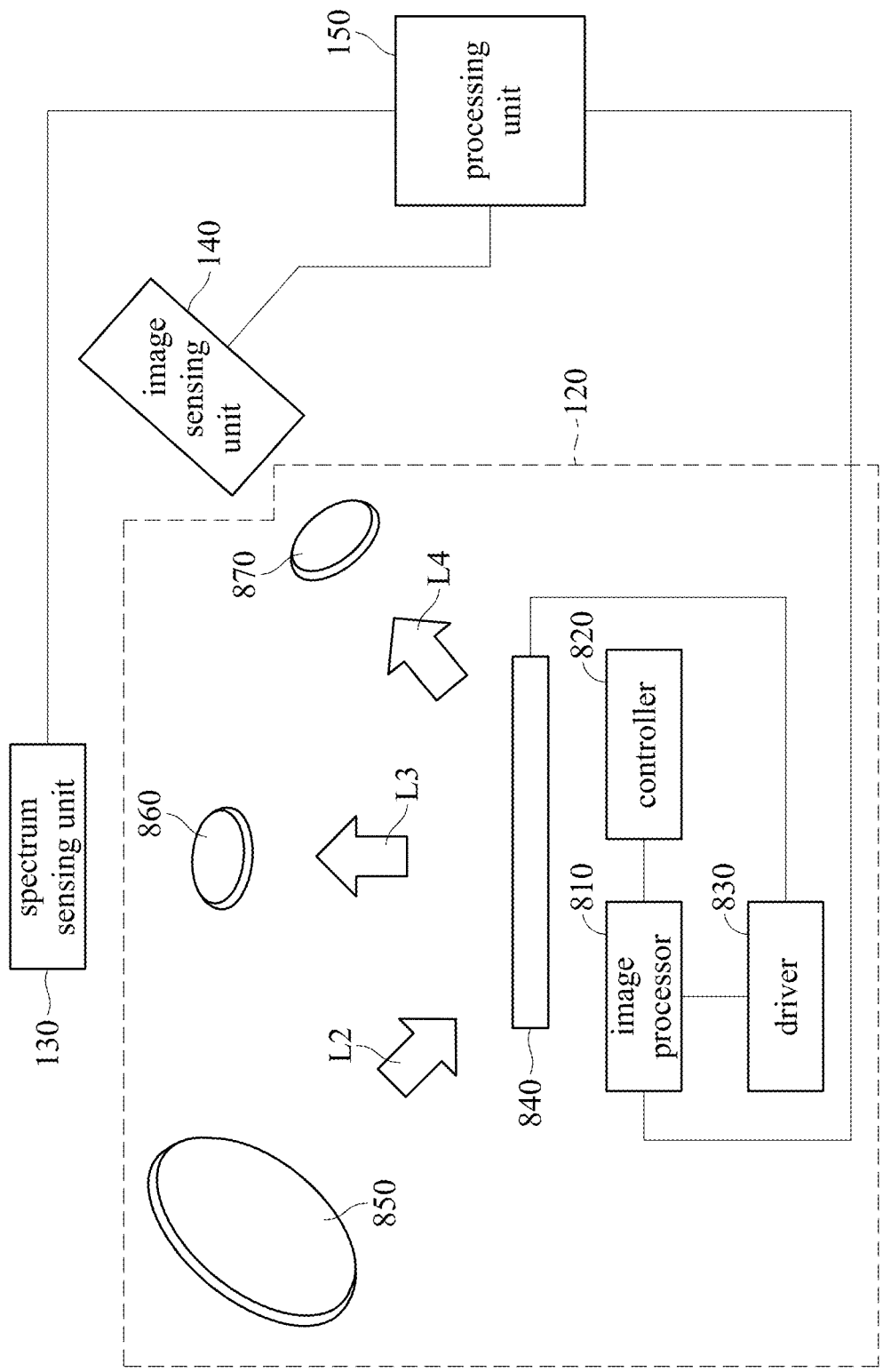
FIG. 8 is a schematic configuration view of a light modulation unit according to an embodiment of the present disclosure.

In some embodiments, the light modulation unit 120 may include an image processor 810, a controller 820, a driver 830 and a modulation module 840, as shown in FIG. 8.

The image processor 810 may receive the modulated image corresponding to the sample 190. That is, the image processor 810 may receive the modulated image corresponding to the sample 190 from the processing unit 150, as shown in FIG. 3A.

The controller 820 may be electrically connected to the image processor 810. The controller 820 obtain the microstructure position and the non-microstructure position corresponding to the sample 190 based on the modulated image. Then, the controller 820 may generate a control signal to the image processor 810 based on the microstructure position and the non-microstructure position, so that the image processor 810 generates an image signal corresponding to the control signal.

The driver 830 may be electrically connected to the image processor 810. The driver 830 may receive the image signal, and generate a driving signal based on the image signal. In the embodiment, the above driving signal may include a signal related to the modulated image 300 of FIG. 3D.

The modulation module 840 may be electrically connected to the driver 830, and may include the light intensity reflective elements. The modulation module 840 may adjust the first part of the light intensity reflective elements to the first angle based on the driving signal (such as the signal related to the modulated image 300 of FIG. 3D). The first part of the light intensity reflective elements corresponds to the microstructure position 310. The first part of the light intensity reflective elements may tilt the second light path L2 to change the third light path L3 to the spectrum sensing unit 130. At the same time, the modulation module 840 may adjust the second part of the light intensity reflective elements to the second angle based on the driving signal. The second part of the light intensity reflective elements corresponds to the non-microstructure position 320. The second part of the intensity reflective elements may tilt the second path L2 to change the fourth light path L4 to the image sensing unit 140.

Figure 2:
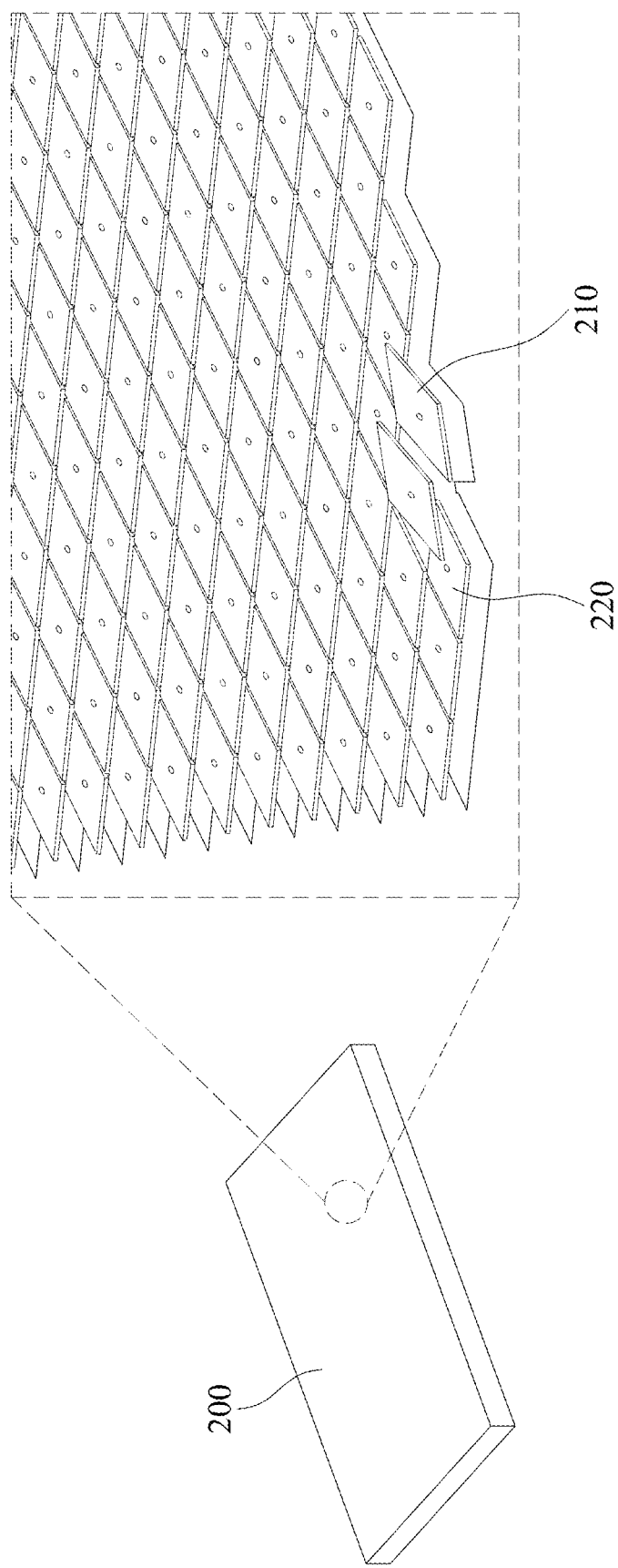
FIG. 2 is a schematic structural view of a light modulation unit including a plurality of microarray lens according to an embodiment of the present disclosure.

In the embodiment, the modulation module 840 is, for example, a spatial light modulator (SLM), and the modulation module 840 may include a digital micro-mirror device (DMD) shown in FIG. 2 or a liquid crystal on silicon (LCOS), but the present disclosure is not limited thereto. The modulation module 840 includes the digital micro-mirror device shown in FIG. 2. The action of the modulation module 840 may adjust the tilted angle of the microlenses 210 and 220 to control the reflected light to pass through one of the perforations in the digital micro-mirror device, so that the spectrometer may measure the amplitude of the reflected light, but the present disclosure is not limited thereto. In addition, the microlens 210 is, for example, tilted at the first angle, and the microlens 220 is, for example, tilted at the second angle.

Furthermore, the light modulation unit 120 further includes a third light focusing unit 850, a fourth light focusing unit 860 and a fifth light focusing unit 870. The third light focusing unit 850 may be disposed between the modulation module 840 and the light splitting unit 113 of the light source unit 110, and receive and project the second light path L2. The fourth light focusing unit 860 may be disposed between the modulation module 840 and the spectrum sensing unit 130, and receive and project the third light path L3. The fifth light focusing unit 870 may be disposed between the modulation module 840 and the image sensing unit 140, and receive and project the fourth light path L4. In the embodiment, the third light focusing unit 850, the fourth light focusing unit 860 and the fifth light focusing unit 870 may be light focusing lenses, but the present disclosure is not limited thereto.

Figure 9:
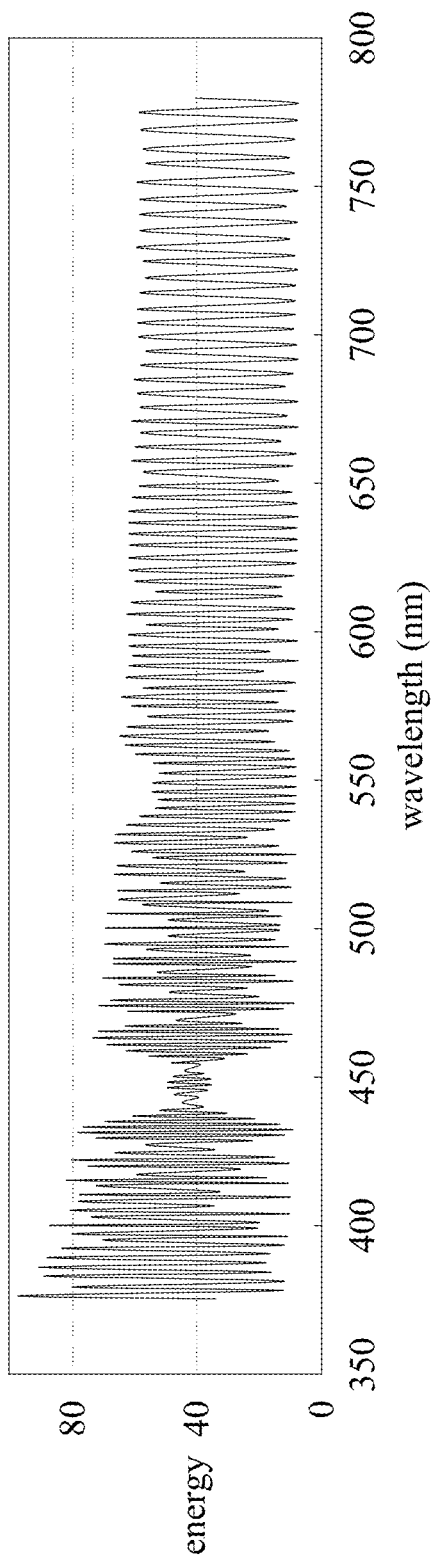
FIG. 9 is a waveform diagram of a spectrum of a spectrum sensing unit corresponding to the modulated image in FIG. 3D according to an embodiment of the present disclosure.
Figure 10:
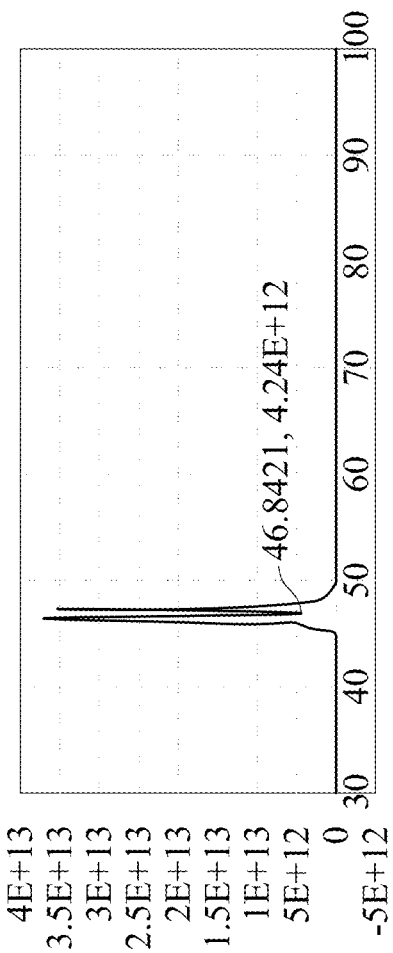
FIG. 10 is a waveform diagram of a signal-to-noise ratio corresponding to a microstructure of a sample corresponding to the modulated image in FIG. 3D according to an embodiment of the present disclosure.

FIG. 9 is a waveform diagram of a spectrum of a spectrum sensing unit corresponding to the modulated image in FIG. 3D based on an embodiment of the present disclosure. FIG. 10 is a waveform diagram of a signal-to-noise ratio corresponding to the microstructure of a sample corresponding to the modulated image in FIG. 3D based on an embodiment of the present disclosure. In FIG. 9 and FIG. 10, the area ratio of the microstructure 191 of the sample 190 may be about 25%. The area ratio of the microstructure 191 is $\alpha(1-\alpha)$, and $\alpha=(W2-W1)/W2$. In this equation, $\alpha$ is the intensity area of the reflected light (i.e., the light of the second light path L2) of the surface layer of the microstructure 191. Moreover, $(1-\alpha)$ is the intensity area of the reflected light (i.e., the light of the second light path L2) of the bottom layer of the microstructure 191. Moreover, W2 is the width of the reflected light (i.e., the light of the second light path L2), and W1 is the width of the bottom layer of the microstructure 191. In addition, it can be seen in FIG. 9 that the amplitude of the interference signal of the spectrum is about 40. It can be seen in FIG. 10 that the signal strength is about 4×1013, and the signal-to-noise ratio may reach about 99.91% (i.e., more than 95%).

Figure 11:
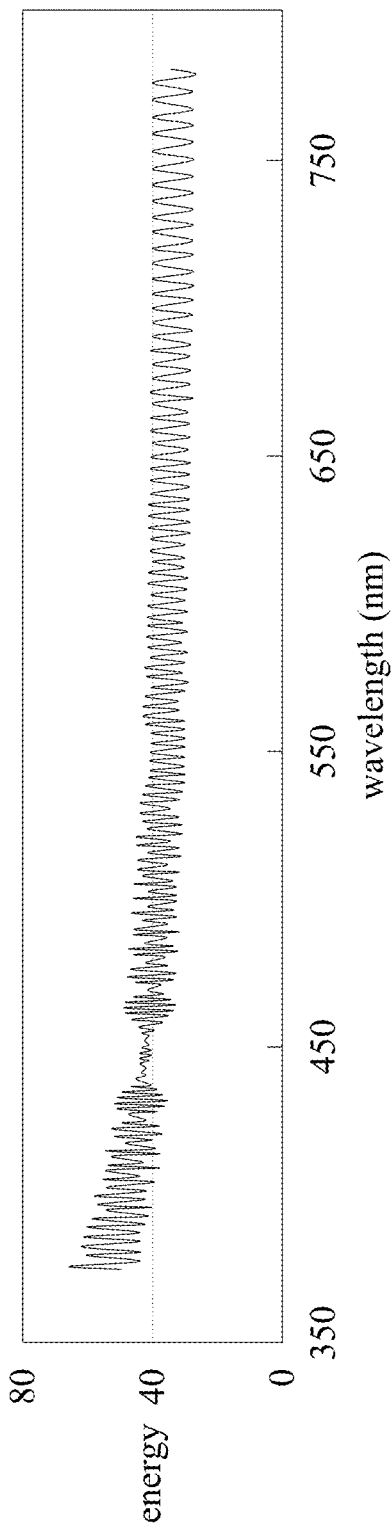
FIG. 11 is a waveform diagram of a spectrum of a spectrum sensing unit corresponding to the modulated image in FIG. 4D according to another embodiment of the present disclosure.
Figure 12:
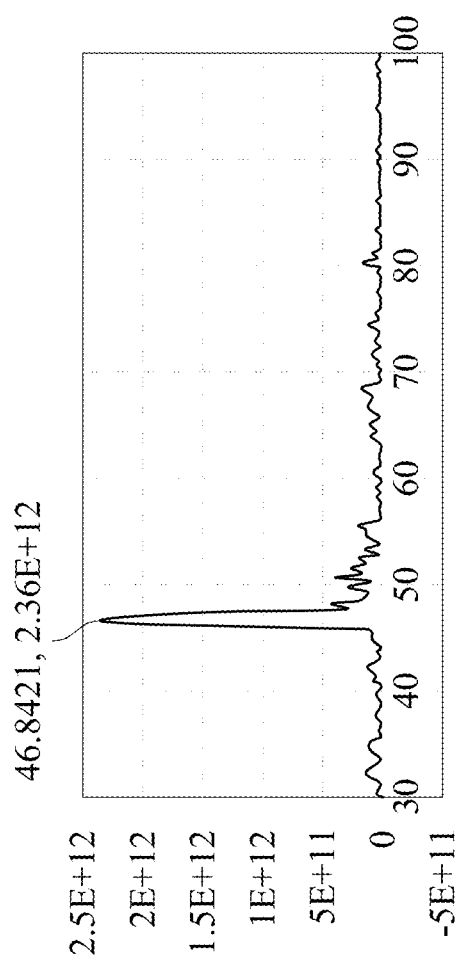
FIG. 12 is a waveform diagram of a signal-to-noise ratio corresponding to a microstructure of a sample corresponding to the modulated image in FIG. 4D according to another embodiment of the present disclosure.

FIG. 11 is a waveform diagram of a spectrum of a spectrum sensing unit corresponding to the modulated image in FIG. 4D based on another embodiment of the present disclosure. FIG. 12 is a waveform diagram of a signal-to-noise ratio corresponding to the microstructure of a sample corresponding to the modulated image in FIG. 4D based on another embodiment of the present disclosure. In FIG. 11 and FIG. 12, the area ratio of the microstructure 191 of the sample 190 is about 1%. In addition, it can be seen in FIG. 11 that the amplitude of the interference signal of the spectrum is about 10. It can be seen in FIG. 12 that the signal strength is about 2.5×1012, and the signal-to-noise ratio may reach about 99.63% (i.e., more than 95%). Furthermore, it can be seen in FIG. 10 and FIG. 12 that the signal-to-noise ratio may be related to the area ratio of the microstructure 191 of the sample, for example, the signal-to-noise ratio may change with the change of the area ratio of the microstructure 191 of the sample 190. For example, when the area ratio of the microstructure 191 of the sample 190 increases, the signal-to-noise ratio may also increase. When the area ratio of the microstructure 191 of the sample 190 decreases, the signal-to-noise ratio may also decrease.

Figure 13:
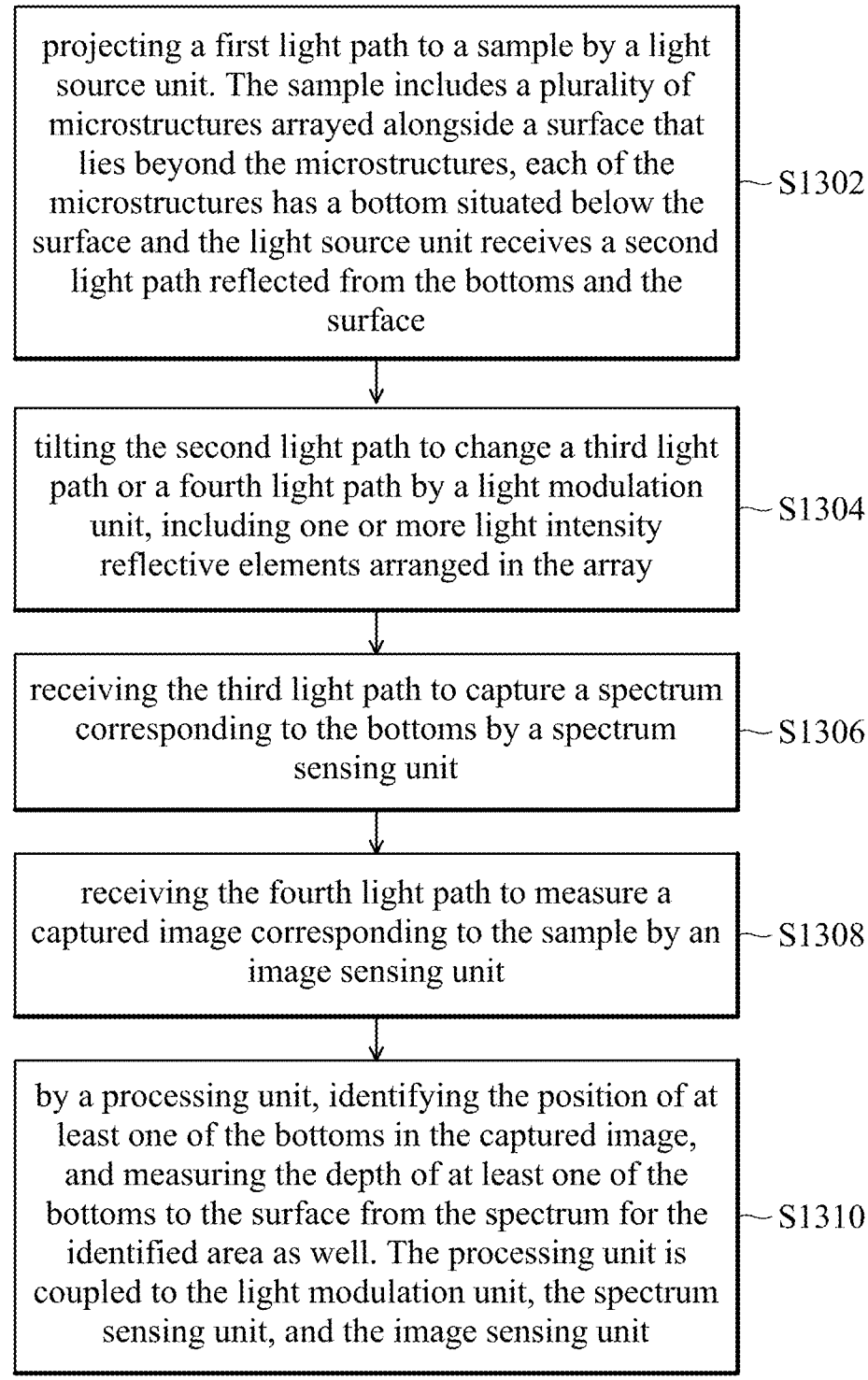
FIG. 13 is a flowchart of a sample depth-measuring method according to an embodiment of the present disclosure.

FIG. 13 is a flowchart of a sample depth-measuring method based on an embodiment of the present disclosure. The sample depth-measuring method of the embodiment is suitable for measuring the depth included in at least one of the microstructures. In step S1302, the method involves projecting a first light path to a sample by a light source unit. The sample includes a plurality of microstructures arrayed alongside a surface that lies beyond the microstructures, each of the microstructures has a bottom situated below the surface and the light source unit receives a second light path reflected from the bottoms and the surface. In step S1304, the method involves tilting the second light path to change a third light path or a fourth light path by a light modulation unit, including one or more light intensity reflective elements arranged in the array. In step S1306, the method involves receiving the third light path to capture a spectrum corresponding to the bottoms by a spectrum sensing unit. In step S1308, the method involves receiving the fourth light path to measure a captured image corresponding to the sample by an image sensing unit. In step S1310, the method involves by a processing unit, identifying the position of at least one of the bottoms in the captured image, and measuring the depth of at least one of the bottoms to the surface from the spectrum for the identified area as well. The processing unit is coupled to the light modulation unit, the spectrum sensing unit, and the image sensing unit. Furthermore, the processing unit further calculate the signal-to-noise ratio corresponding to the microstructure of the sample based on the spectrum and the captured image. In the embodiment, the above signal-to-noise ratio is, for example, more than 95%.

Figure 14:
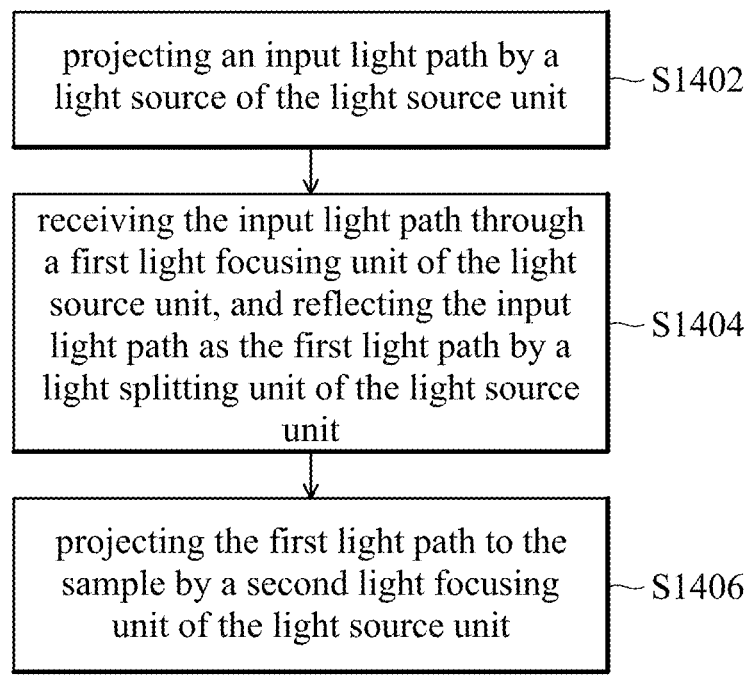
FIG. 14 is a detailed flowchart of step S1302 in FIG. 13.

FIG. 14 is a detailed flowchart of step S1302 in FIG. 13. In step S1402, the method involves projecting an input light path by a light source of the light source unit. In step S1404, the method involves receiving the input light path through a first light focusing unit of the light source unit, and reflecting the input light path as the first light path by a light splitting unit of the light source unit. In step S1406, the method involves projecting the first light path to the sample by a second light focusing unit of the light source unit. In the embodiment, the light source is a white light, an infrared light, an ultraviolet light, or a broadband light source.

Figure 15:
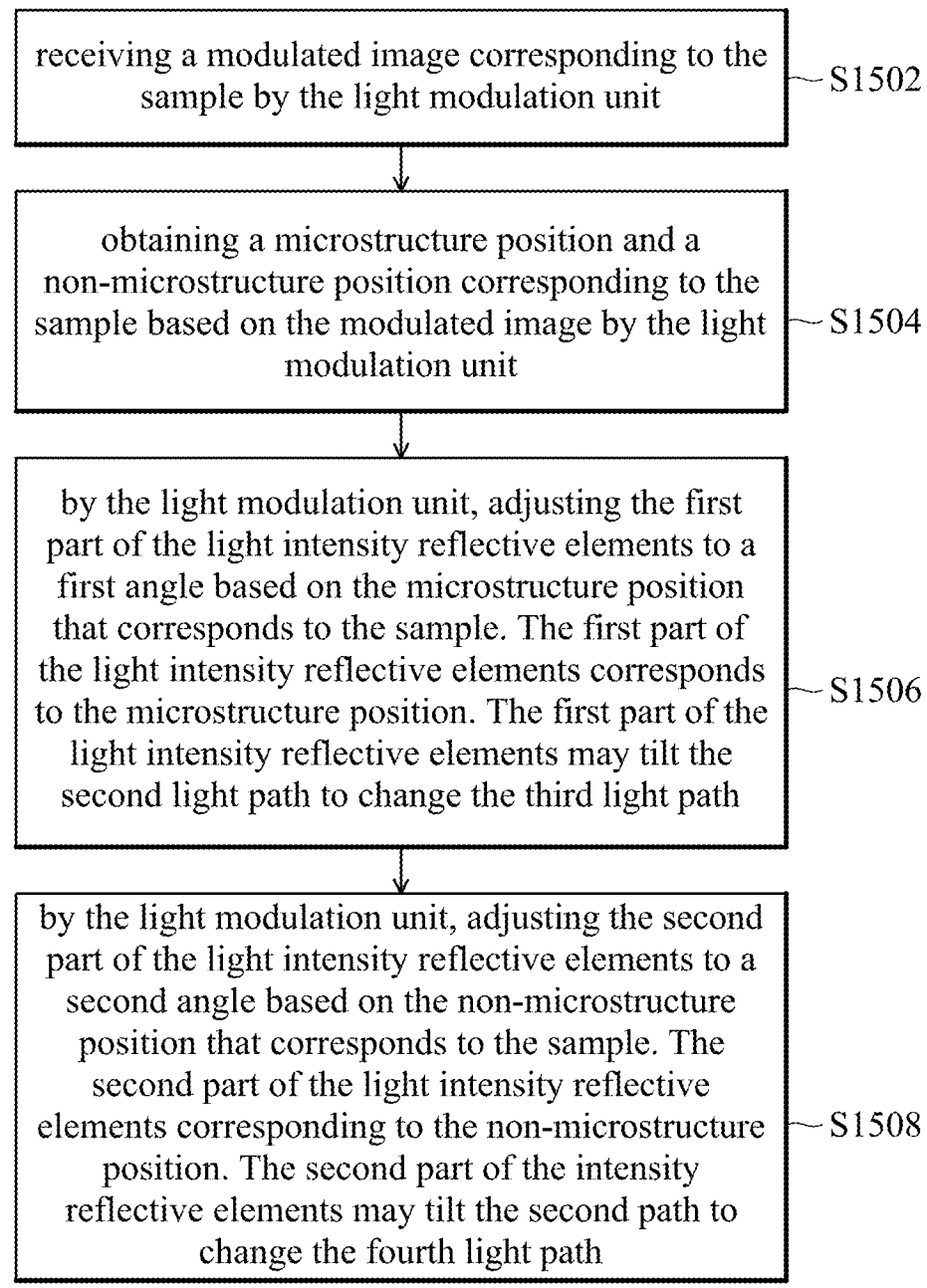
FIG. 15 is a detailed flowchart of step S1304 in FIG. 13.

FIG. 15 is a detailed flowchart of step S1304 in FIG. 13. In step S1502, the method involves receiving a modulated image corresponding to the sample by the light modulation unit. In step S1504, the method involves obtaining a microstructure position and a non-microstructure position corresponding to the sample based on the modulated image by the light modulation unit. In step S1506, the method involves by the light modulation unit, adjusting the first part of the light intensity reflective elements to a first angle based on the microstructure position that corresponds to the sample. The first part of the light intensity reflective elements corresponds to the microstructure position. The first part of the light intensity reflective elements may tilt the second light path to change the third light path. In step S1508, the method involves by the light modulation unit, adjusting the second part of the light intensity reflective elements to a second angle based on the non-microstructure position that corresponds to the sample. The second part of the light intensity reflective elements corresponding to the non-microstructure position. The second part of the intensity reflective elements may tilt the second path to change the fourth light path.

Figure 16:
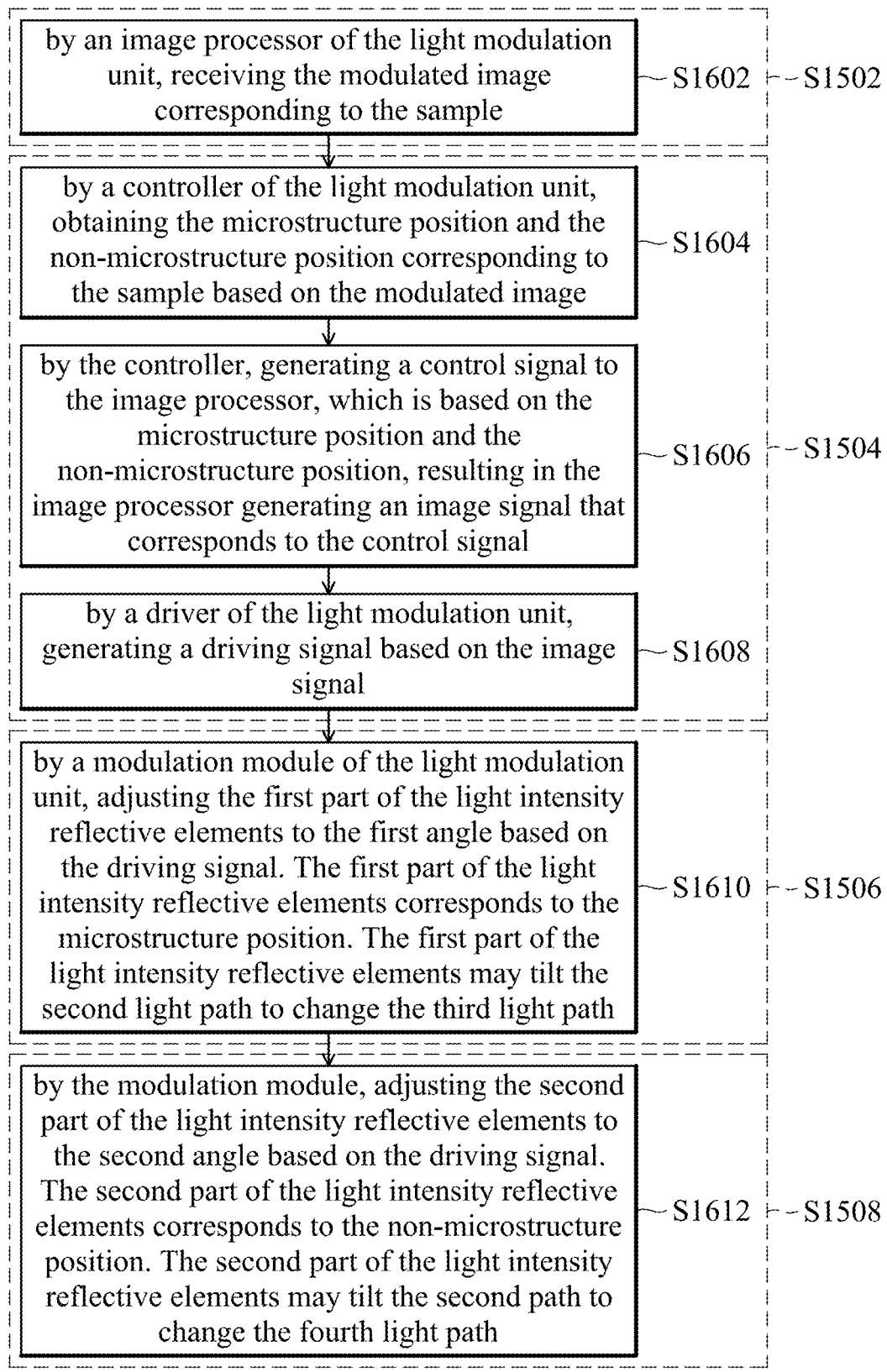
FIG. 16 is a detailed flowchart of steps S1502-S1508 in FIG. 15.

FIG. 16 is a detailed flowchart of steps S1502-S1508 in FIG. 15. In step S1602, the method involves by an image processor of the light modulation unit, receiving the modulated image corresponding to the sample. In step S1604, the method involves by a controller of the light modulation unit, obtaining the microstructure position and the non-microstructure position corresponding to the sample based on the modulated image. In step S1606, the method involves by the controller, generating a control signal to the image processor, which is based on the microstructure position and the non-microstructure position, resulting in the image processor generating an image signal that corresponds to the control signal. In step S1608, the method involves by a driver of the light modulation unit, generating a driving signal based on the image signal. In step S1610, the method involves by a modulation module of the light modulation unit, adjusting the first part of the light intensity reflective elements to the first angle based on the driving signal. The first part of the light intensity reflective elements corresponds to the microstructure position. The first part of the light intensity reflective elements may tilt the second light path to change the third light path. In step S1612, the method involves by the modulation module, adjusting the second part of the light intensity reflective elements to the second angle based on the driving signal. The second part of the light intensity reflective elements corresponds to the non-microstructure position. The second part of the light intensity reflective elements may tilt the second path to change the fourth light path. In the embodiment, the modulation module includes, for example, a digital micro-mirror device or a liquid crystal on silicon.

In summary, based on the sample depth-measuring device and method disclosed by the embodiments of the present disclosure, the light source unit projects the first light path to the sample and receives the second light path reflected from the sample. The second light path is tilted by the light intensity reflective elements to change the third light path or the fourth light path. The spectrum sensing unit receives the third light path to capture the spectrum corresponding to the bottoms. The image sensing unit receives the fourth light path to measure the captured image corresponding to the sample. When the processing unit identifies the position of at least one of the bottoms in the captured image, the processing unit measures the depth of at least one of the bottoms to the surface from the spectrum for the identified area. Therefore, the present disclosure may greatly reduce the reflection of the surface signal, and increase the bottom signal at the same time to increase the intensity of the interference signal, thereby accurately measuring the measurement result consistent with the actual depth of the small-aperture structures, the low-density structure or the single-via micrometer structure.

While the present disclosure has been described by way of example and in terms of the embodiments, it should be understood that the present disclosure is not limited to the disclosed embodiments. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A sample depth-measuring device, comprising:
    a light source unit, configured to project a first light path to a sample and receive a second light path reflected from the sample, wherein the sample comprises a plurality of microstructures arrayed alongside a surface that lies beyond the microstructures, and each of the microstructures has a bottom situated below the surface;
    a light modulation unit, comprising an array of light intensity reflective elements arranged in a plurality, which are configured to reflect light onto the second light path within the array, wherein one or more light intensity reflective elements tilt the second light path, resulting in a change to either a third light path or a fourth light path;
    a spectrum sensing unit, configured to receive the third light path to capture a spectrum corresponding to the bottoms;
    an image sensing unit, configured to receive the fourth light path to measure a captured image corresponding to the sample;
    a processing unit, coupled to the light modulation unit, the spectrum sensing unit and the image sensing unit, wherein when the processing unit identifies a position of at least one of the bottoms in the captured image, the processing unit measures a depth of at least one of the bottoms to the surface from the spectrum for the identified area.

2. The sample depth-measuring device as claimed in claim 1, wherein the light source unit comprises:
    a light source, configured to project an input light path;
    a first light focusing unit, configured to focus the input light path;
    a light splitting unit, configured to receive the input light path through the first light focusing unit, and reflect the input light path as the first light path; and
    a second light focusing unit, configured to project the first light path to the sample.

3. The sample depth-measuring device as claimed in claim 1, wherein the light modulation unit further receives a modulated image corresponding to the sample;
    wherein the light modulation unit obtains a microstructure position and a non-microstructure position corresponding to the sample based on the modulated image;
    wherein the light modulation unit adjusts a first part of the light intensity reflective elements corresponding to the microstructure position to a first angle based on the microstructure position corresponding to the sample, and tilts the second light path through the first part of the light intensity reflective elements to change the third light path;
    wherein the light modulation unit adjusts a second part of the light intensity reflective elements corresponding to the non-microstructure position to a second angle based on the non-microstructure position corresponding to the sample, and tilts the second path through the second part of the intensity reflective elements to change the fourth light path.

4. The sample depth-measuring device as claimed in claim 3, wherein the light modulation unit comprises:
    an image processor, configured to receive the modulated image corresponding to the sample;
    a controller, configured to obtain the microstructure position and the non-microstructure position corresponding to the sample based on the modulated image, and generate a control signal to the image processor based on the microstructure position and the non-microstructure position, so that the image processor generates an image signal corresponding to the control signal;
    a driver, configured to generate a driving signal based on the image signal; and
    a modulation module, based on the driving signal to tilt the first or second part of the light intensity reflective elements, the first part corresponding to the microstructure position and the second part corresponding to the non-microstructure position,
    wherein the second light path is changed to the third light path when the first part is tilted to the first angle, and the second path is changed to the fourth light path when the second part is tilted to the second angle.

5. The sample depth-measuring device as claimed in claim 4, wherein the modulation module comprises a digital micro-mirror device or a liquid crystal on silicon.

6. A sample depth-measuring method, comprising:
    by a light source unit, projecting a first light path to a sample, wherein the sample comprises a plurality of microstructures arrayed alongside a surface that lies beyond the microstructures, each of the microstructures has a bottom situated below the surface and the light source unit receives a second light path reflected from the bottoms and the surface;
    by a light modulation unit comprising an array of light intensity reflective elements arranged in a plurality, reflecting light onto the second light path within the array, wherein one or more light intensity reflective elements tilt the second light path, resulting in a change to either a third light path or a fourth light path;
    by a spectrum sensing unit, receiving the third light path to capture a spectrum corresponding to the bottoms;
    by an image sensing unit, receiving the fourth light path to measure a captured corresponding to the sample; and
    by a processing unit that is coupled to the light modulation unit, the spectrum sensing unit and the image sensing unit, identifying a position of at least one of the bottoms in the captured image, and measuring a depth of at least one of the bottoms to the surface from the spectrum for the identified area.

7. The sample depth-measuring method as claimed in claim 6, wherein the step of projecting the first light path to the sample by the light source unit comprises:
    by a light source of the light source unit, projecting an input light path;
    by a light splitting unit of the light source unit, receiving the input light path through a first light focusing unit of the light source unit, and reflecting the input light path as the first light path; and
    by a second light focusing unit of the light source unit, projecting the first light path to the sample.

8. The sample depth-measuring method as claimed in claim 6, wherein the step of tilting the second light path by selectively adjusting one or more light intensity reflective elements comprises:

by the light modulation unit, receiving a modulated image corresponding to the sample;

by the light modulation unit, obtaining a microstructure position and a non-microstructure position corresponding to the sample based on the modulated image;

by the light modulation unit, adjusting a first part of the light intensity reflective elements corresponding to the microstructure position to a first angle based on the microstructure position corresponding to the sample, and tilting the second light path through the first part of the light intensity reflective elements to change the third light path; and by the light modulation unit, adjusting a second part of the light intensity reflective elements corresponding to the non-microstructure position to a second angle based on the non-microstructure position that is corresponds to the sample, and tilting the second path through the second part of the intensity reflective elements to change the fourth light path.

9. The sample depth-measuring method as claimed in claim 8, wherein the step of receiving the modulated image by the light modulation unit comprises:

by an image processor of the light modulation unit, receiving the modulated image corresponding to the sample;

wherein the step of obtaining the microstructure position and the non-microstructure position by the light modulation unit comprises:

by a controller of the light modulation unit, obtaining the microstructure position and the non-microstructure position corresponding to the sample based on the modulated image;

by the controller, generating a control signal to the image processor, which is based on the microstructure position and the non-microstructure position, resulting in the image processor generating an image signal that corresponds to the control signal; and by a driver of the light modulation unit, generating a driving signal based on the image signal;

wherein the step of adjusting the first part of the light intensity reflective elements by the light modulation unit comprises:

by a modulation module of the light modulation unit, adjusting the first part of the light intensity reflective elements corresponding to the microstructure position to the first angle based on the driving signal, and tilting the second light path through the first part of the light intensity reflective elements to change the third light path;

wherein the step of adjusting the second part of the light intensity reflective elements by the light modulation unit comprises:

by the modulation module, adjusting the second part of the light intensity reflective elements corresponding to the non-microstructure position to the second angle based on the driving signal, and tilting the second path through the second part of the intensity reflective elements to change the fourth light path.

10. The sample depth-measuring method as claimed in claim 9, wherein the modulation module comprises a digital micro-mirror device or a liquid crystal on silicon.

* * * * *